United States Patent
Schäty

(10) Patent No.: US 7,870,648 B2
(45) Date of Patent: Jan. 18, 2011

(54) DISK-SHAPED OBJECT OF SYNTHETIC THERMOPLASTIC MATERIAL, AND METHOD FOR PRODUCING SAME

(75) Inventor: Harald Schäty, Wetzlar (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/388,207

(22) Filed: Feb. 18, 2009

(65) Prior Publication Data

US 2009/0208697 A1    Aug. 20, 2009

Related U.S. Application Data

(62) Division of application No. 10/779,771, filed on Feb. 18, 2004, now abandoned.

(30) Foreign Application Priority Data

Feb. 19, 2003 (DE) .................. 103 07 108
Jan. 29, 2004 (DE) ............. 10 2004 004 701

(51) Int. Cl.
*B60R 13/00* (2006.01)
*F16B 5/02* (2006.01)
*F16B 17/00* (2006.01)
*F16B 37/04* (2006.01)

(52) U.S. Cl. ............... 24/297; 24/304; 24/453; 411/172; 411/182

(58) Field of Classification Search .......... 428/80, 428/141; 24/304, DIG. 11, 297, 453; 411/508–511, 411/172, 182
See application file for complete search history.

(56) References Cited

U.S. PATENT DOCUMENTS

| | | | |
|---|---|---|---|
| 4,363,420 A * | 12/1982 | Andrews | 220/787 |
| 5,223,315 A | 6/1993 | Katsura et al. | |
| 5,314,280 A * | 5/1994 | Gagliardi et al. | 411/182 |
| 5,340,649 A | 8/1994 | Roeker et al. | |
| 5,852,854 A * | 12/1998 | Pierrot et al. | 24/297 |
| 6,863,956 B1 * | 3/2005 | Nakajima et al. | 428/156 |

FOREIGN PATENT DOCUMENTS

| | | |
|---|---|---|
| JP | 55-62543 U | 4/1980 |
| JP | 02-184436 A | 7/1990 |
| JP | 10-259363 A | 9/1998 |
| JP | 2001-220183 A | 8/2001 |
| WO | WO 0102316 A1 * | 1/2001 |

* cited by examiner

*Primary Examiner*—Robert J Sandy
(74) *Attorney, Agent, or Firm*—Michael P. Leary

(57) ABSTRACT

A disk-shaped object of synthetic thermoplastic material has contact surfaces on opposite sides that possess a rough texture. In a method for production of the disk-shaped object, synthetic material is injected under pressure in a plasticized state into a cooled molding tool and removed therefrom after a cooling phase, the molding tool having correspondingly rough molding surfaces to form the rough contact surfaces of the object.

10 Claims, 1 Drawing Sheet

DISK-SHAPED OBJECT OF SYNTHETIC THERMOPLASTIC MATERIAL, AND METHOD FOR PRODUCING SAME

CROSS-REFERENCE TO RELATED APPLICATIONS

This application is a divisional of U.S. patent application Ser. No. 10/779,771 filed Feb. 18, 2004. Also, this application claims the benefit of German Patent Application 10307108.3 filed 19 Feb. 2003 and German Patent Application 102004004701.4 filed 29 Jan. 2004. The disclosures of the above are incorporated herein by reference.

BACKGROUND OF THE INVENTION

This invention relates to a disk-shaped object of synthetic thermoplastic material and to a method for producing the same.

Disk-shaped objects are employed, for example, as an intermediate between structural parts to seal them off from one another and/or connect them adhesively to one another. Examples of such applications are disclosed in GB 2,067,253 A and EP 0,504,957 A2. In these applications, a disk-shaped object is arranged between parts to be connected and then brought into a flowable state by heating, so that the disk-shaped object will adhesively connect the two parts to one another and possibly penetrate gaps between the parts to seal them tight.

In the production and assembly of disk-shaped objects of the kind specified, various problems have arisen. The objects have been difficult to remove from the recess of a molding tool. Objects of annular shape especially have also exhibited a marked ill-defined warping and shrinking behavior, so that prescribed dimensions have failed to be reliably attained. Furthermore, individual objects when transported in bulk have tended to stick together, interfering considerably with individual use, especially in automatic assembly. Experiments with a suitable liquid as parting agent, to prevent the individual objects from sticking together, have failed to yield satisfactory results.

BRIEF DESCRIPTION OF THE INVENTION

Accordingly, an object of the invention is so to configure disk-shaped objects of the kind specified so that they are easily isolated and assembled.

Another object of the invention is to improve a process of production of such objects, to alleviate unmolding problems and to prevent warping and shrinking of the objects.

According to the invention, contact surfaces provided on opposite sides of a disk-shaped object of synthetic thermoplastic material are made rough. Surprisingly, it has been found that with a rough condition of the contact surfaces, adjacent disk-shaped objects no longer have the tendency to stick together, but are easily separated and isolated from each other. No additional parting agents are required. Mechanical means of automatically isolating and assembling the objects formed according to the invention can therefore be operated without trouble.

By a process according to the invention, suitable roughness of the contact surfaces is generated in the forming of the objects. More particularly, molding surfaces of a molding tool forming the contact surfaces are provided with a roughness matching the desired contact surfaces of the objects. Due to the roughness, a disk-shaped object is better secured in the tool, and disadvantageous shrinking and warping effects are avoided. Further, it has been found that by opening the molding tool prior to complete cooling, slight residual shrinkage, still to occur, favors the parting of object and tool, considerably facilitating the unmolding and ejection of the object from the molding tool. Deformations of the object, caused by the unmolding operation, are avoided in this way.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
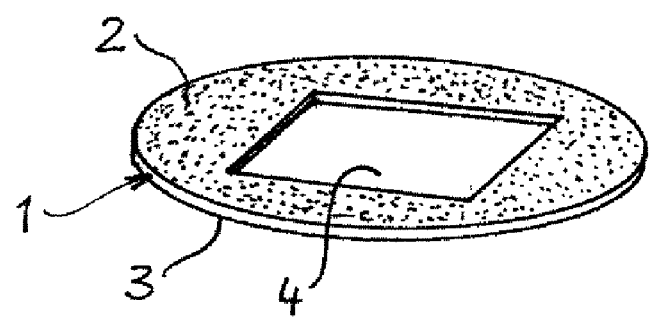
FIG. 1 shows a perspective representation of a disk-shaped object according to the invention.

In one embodiment according to the invention, an object 1 shown in FIG. 1 is in the form of a circular disk having two parallel circular faces, forming contact surfaces 2, 3. The disk has a diameter of about 15 mm and a thickness of about 1 mm, for example. In the center of the object 1, there is a square through-hole 4. The diagonal dimension of the hole 4 is smaller than the outside diameter of the object 1, of course. A disk-shaped object in accordance with the invention may have a non-circular contour and may have a non-square hole.

The object 1 is made of a thermoplastic adhesive that can be brought into a flowable state by heating. At a temperature of about 20° C., for example, the material of the object 1 is solid, not completely rigid but elastically deformable. Such an adhesive of polyamide is obtainable under the trade designation Thermelt by the firm of Bostik Findley GmbH, 33829 Borghausen. Using this known adhesive, the advantages of the invention have appeared with especial clarity.

The object 1 is intended for use as an intermediate between structural parts connectable to one another. For such use, it may be necessary to produce a considerable number of objects 1, which are then transported to a place of use, more or less in bulk, in suitable receptacles. Then, the objects 1, as delivered, must be individually fed in an assembling operation. In order for such use to be easily and quickly accomplished, by automatic means if required, the contact surfaces 2, 3 of the objects 1 are provided with a rough surface texture. Due to the roughness of the contact surfaces 2, 3, the objects 1, even if the synthetic thermoplastic material is fairly soft, have no tendency to adhere to each other, so that they are easily separated.

The production of an object 1 of thermoplastic adhesive is preferably performed by an injection molding process. Under heat and pressure, plasticized synthetic adhesive is injected into molding recesses of a cooled molding tool. After a cooling phase, the molding tool is opened and an object, meanwhile solidified, is removed therefrom.

Figure 2:
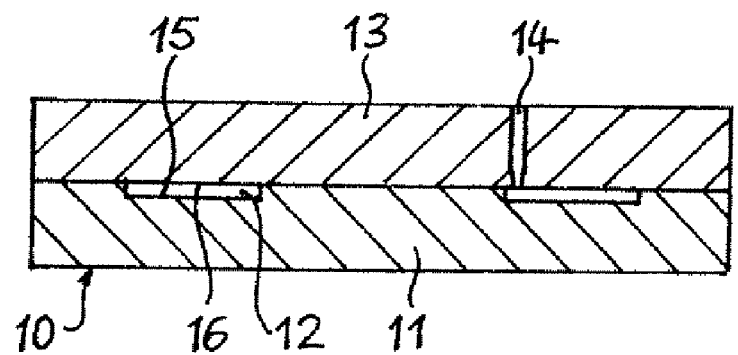
FIG. 2 shows a cross-section of a molding tool for producing an object according to the invention.

In FIG. 2, a suitable molding tool 10 is represented in section. It comprises a bottom tool half 11 having a recess 12 matching the shape of the object 1 and an upper tool half 13 closing the recess 12. In the upper tool half 13, a supply passage 14 is provided for feeding the plasticized adhesive.

In order to generate the rough texture of the contact surfaces 2, 3 during the actual production of an object 1, the matching molding surfaces 15, 16 of the tool halves 11, 13 are provided with a rough surface of corresponding roughness depth. The roughness of the surfaces of the tool halves 11, 13, of a high-strength steel, for example, may advantageously be generated by spark erosion.

The roughness of the molding surfaces 15, 16 of the molding tool 10, besides generating rough contact surfaces 2, 3, has the surprising advantage that after injection of the adhesive into the molding tool 10, the object 1 is preserved in its preassigned shape during cooling, and does not tend to shrink or warp in an undesired manner. After a well-defined cooling phase in which the object 1 has attained a solid state, though without having been completely cooled as yet, the molding tool is opened by taking off the tool half 13. During cooling that continues after the molding tool has been opened, the object 1 shrinks slightly and, due to the roughness of the surfaces of object 1 and tool half 11 in contact with each other, the object 1 detaches itself from the tool half 11 automatically, so that it can easily be removed or ejected from the recess 12 of the molding tool 10.

For the purpose of the invention, an averaged German Standard DIN 4768 roughness depth $R_z$ of the corresponding surfaces of the object and of the molding tool from 40 to 100µ is especially suitable. Preferably, the average roughness depth lies in the range from 55 to 70µ. Suitable arithmetic mean rugosities $R_a$ lie in a range from 6 to 25µ, preferably in a range from 10 to 15µ, such as 12.5µ.

The averaged roughness depth $R_z$ designates the mean rugosity of five reference segments within an evaluation length. The arithmetic mean rugosity $R_a$ is the arithmetic mean of the absolute values of the profile deviations within a reference segment.

Figure 3:
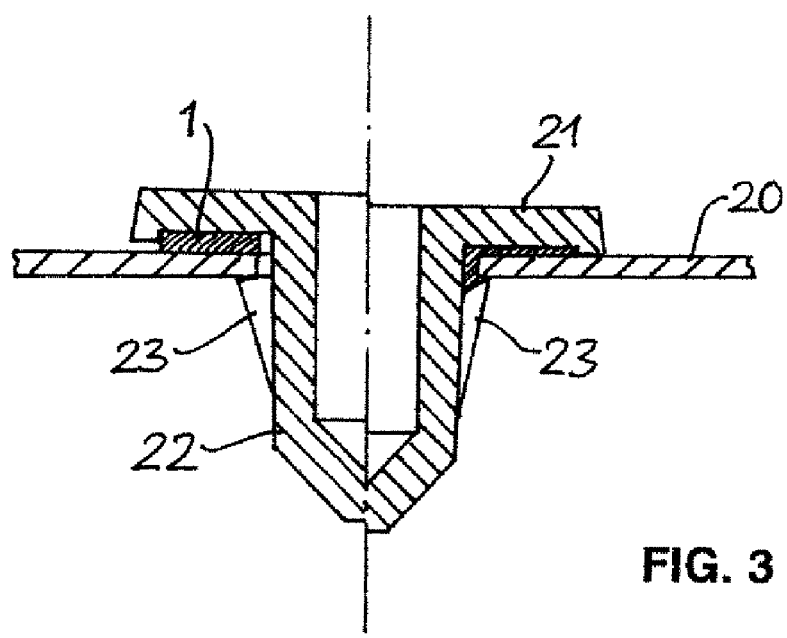
FIG. 3 shows the use of a disk-shaped object according to the invention for tight connection of two structural parts.

FIG. 3 shows a preferred application of the disk-shaped object 1. In this application, the object 1, as shown in the left-hand half of the representation in FIG. 3, is mounted between a plate-like part 20 and the flange 21 of a fastening element 22 inserted in an opening of the part 20, for example a bodywork sheet. In the form shown, the fastening element 22 comprises spring locking elements 23, bearing on the side of the substrate 20 away from the flange 21 and pressing the fastening element 22 against the object 1 and the part 20. The arrangement, preassembled in this way, is then heated, in an oven, for example, to such an extent that the thermoplastic adhesive of which the object 1 is constituted becomes flowable. In a flowable state, the object 1 is compressed by the contact force of the locking elements 23, as indicated in the right-hand half of the representation in FIG. 3. Thus, the flange 21 is drawn into contact with the part 20, the material of the object 1 flowing into the annular gap between the opening and the fastening element 22, and sealing it completely. By the adhesive action of the thermoplastic adhesive of the object 1, moreover, the load capacity of the connection between fastening element 22 and part 20 is enhanced.

While preferred embodiments of the invention have been shown and described, it will be apparent that modifications can be made without departing from the principles and spirit of the invention, the scope of which is defined in the appended claims.

What is claimed is:

1. An assembly comprising:
   a fastening element;
   a part assembled with the fastening element; and
   an object interposed between at least a portion of the fastening element and the part; wherein the object comprises:
   a single layer synthetic thermoplastic adhesive material, the adhesive material having contact surfaces of the single layer on opposite sides of the adhesive material of the single layer that are rough, wherein the average roughness depth $R_z$ of the contact surfaces is in the range of 40 to 100µ.

2. The assembly according to claim 1, wherein the object includes a central hole.

3. The assembly according to claim 2, wherein a portion of the fastening element protrudes through the central hole.

4. The assembly according to claim 3, wherein the fastening element comprises a flange and the object is interposed between the flange and the part.

5. The assembly according to claim 4, wherein the part is a plate-shaped member.

6. The assembly according to claim 5, wherein the fastening element further includes a spring locking element plate-shaped member and the plate-shaped member comprises a first side and a second side opposite the first side; and
   wherein the flange is adjacent to the first side of the plate-shaped member and the spring locking element is adjacent to the second side of the plate shaped member.

7. The assembly according to claim 1, wherein the arithmetic mean rugosity of the contact surfaces lies in the range of 6 to 25µ.

8. The assembly according to claim 1, wherein the arithmetic mean rugosity of the contact surfaces lies in the range of 10 to 15µ.

9. The assembly according to claim 1, wherein the averaged roughness depth of the contact surfaces is in the range of 55 to 70µ.

10. The assembly according to claim 1, wherein the rough adhesive material contact surfaces occupy the entirety of the opposite sides of the single layer.

* * * * *